Figure 4:
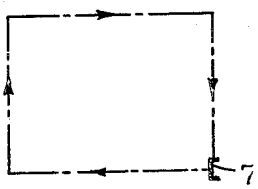

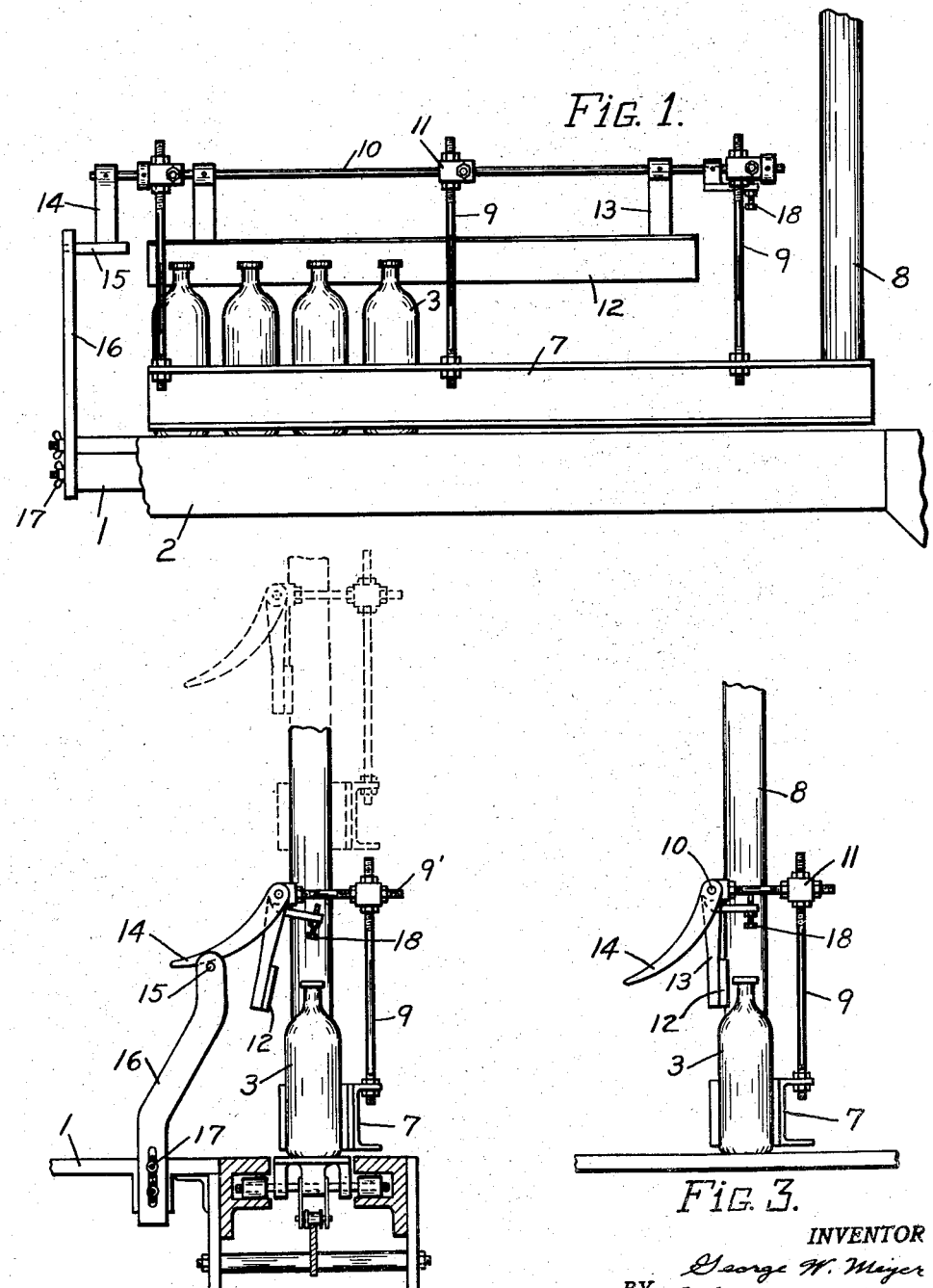

April 16, 1935.  G. W. MEYER  1,998,163
BOTTLE TRANSFER MECHANISM
Filed Jan. 29, 1932   3 Sheets-Sheet 2

INVENTOR
George W. Meyer
BY William B. Jaspert
ATTORNEY

Patented Apr. 16, 1935

1,998,163

UNITED STATES PATENT OFFICE 1,998,163

BOTTLE TRANSFER MECHANISM

George W. Meyer, Aspinwall, Pa., assignor to Amco, Incorporated, Pittsburgh, Pa., a corporation of Pennsylvania Application January 29, 1932, Serial No. 589,672

10 Claims. (Cl. 198—31)

This invention relates to means for preventing tilting or upsetting of ware in ware transfer mechanism and is particularly applicable for use on transfer arms which transfer rows of bottles delivered by a ware forming machine to the conveyor belt of glass annealing lehrs.

It is among the objects of the invention to provide simple means for holding bottles and jars in an upright position and prevent tilting of the same while being transferred in rows to a movable conveyor or the like, and which shall be applicable to various types of transfer devices which slide the ware by swinging or pushing it over a smooth surface.

Figure 6:
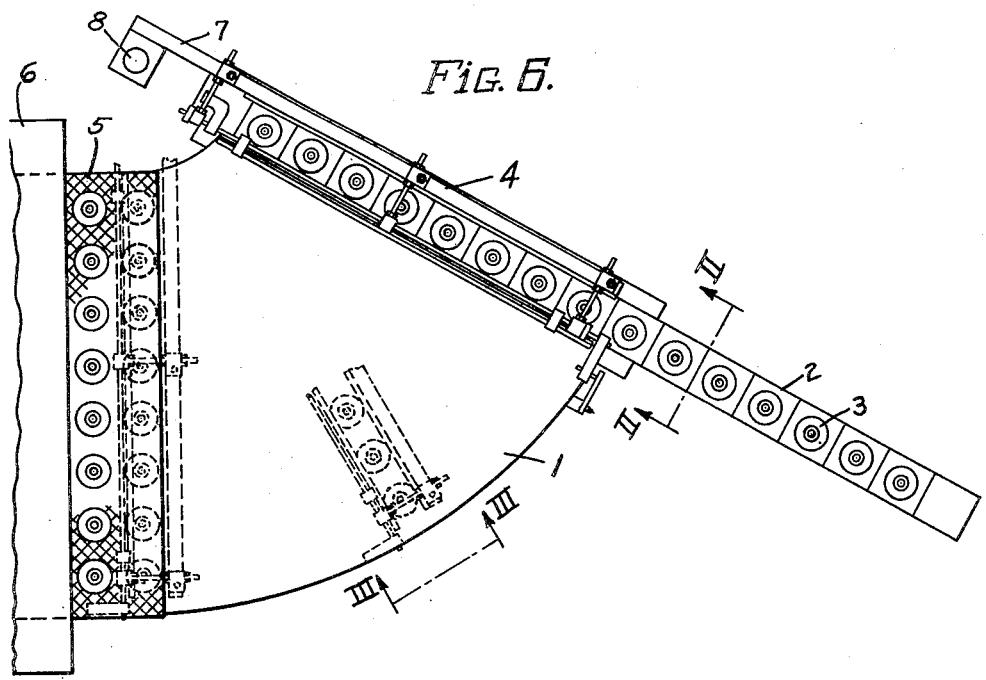

The invention will become more apparent from a consideration of the accompanying drawings constituting a part hereof in which like reference characters designate like parts and in which:

Figure 1 is a rear elevational view of a ware transfer mechanism embodying the principles of this invention;

Figure 2 a cross-sectional view of a portion of a narrow conveyor showing the ware transfer mechanism in end elevation as taken along the line II—II, Figure 6;

Figure 3 an end elevational view of the transfer mechanism illustrating the ware retaining arm in normally lowered position as viewed from III—III, Figure 6 of the drawings.

Figure 5:
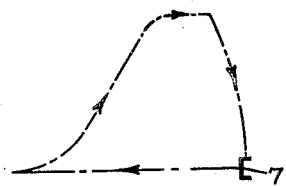
Figure 7:
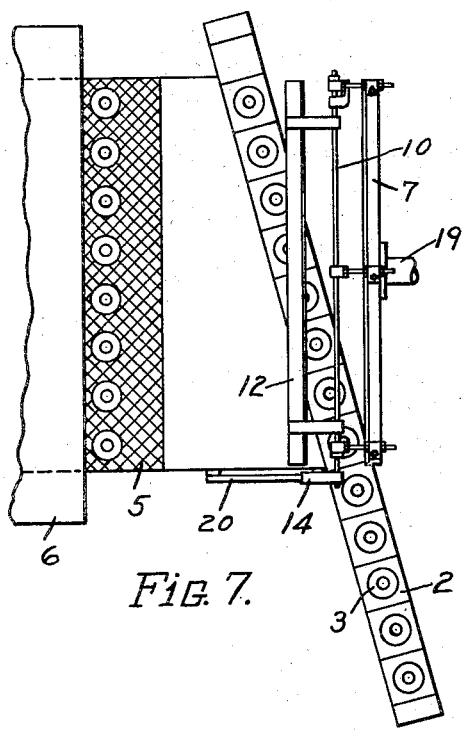
Figure 8:
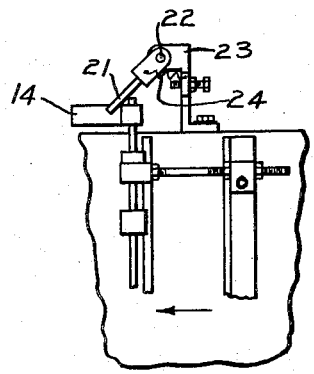
Figure 9:
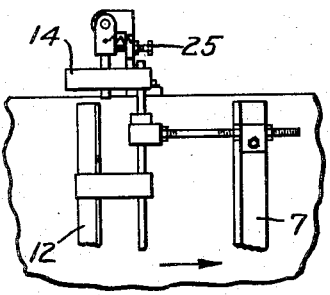
Figure 10:
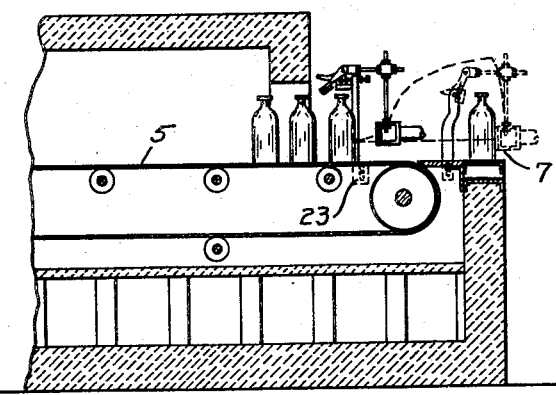

Figure 4, a diagrammatic view illustrating the path of movement of one type of transfer arm;

Figure 5 a similar view illustrating the movement of the arm in a different path;

Figure 6 a top plan view of a lehr loading device and a portion of an annealing lehr to which the invention is applied;

Figure 7 a top plan view of a portion of an annealing lehr, a conveyor, and a pusher mechanism embodying the principles of this invention;

Figure 8 a plan view of a portion of the transfer arm and an engaging mechanism therefor;

Figure 9 a similar view illustrating one position of the retaining arm as effected by the tripping mechanism; and, Figure 10 a longitudinal sectional view of the charging end of a glass annealing lehr illustrating the manner of loading the ware on the conveyor belt.

With reference to Figures 1 to 6 inclusive of the drawings, the structure therein illustrated comprises a loading platform 1 in alinement with an escalator buck or conveyor mechanism 2 by means of which bottles or other containers 3 are delivered in rows to the loading platform 1 and from which they are transferred by a transfer mechanism generally designated at 4 to the conveyor belt 5 of a glass annealing lehr 6.

The transfer arm is more clearly illustrated in Figures 1 to 3 inclusive of the drawings, and consists of a bar 7 secured at one end to a pivot 8 by means of which the arm 7 is subjected to swinging movement. The bar 7 is provided with uprights in the form of rods 9 to which a horizontal supporting rod 10 is secured by clamping blocks 11, the blocks being fastened to rods 9 in a manner to render them vertically adjustable to vary the relative height of the rod 10 and swinging bar 7, and to provide for horizontal adjustment of rods 9' to which the rod 10 is clamped. By means of these adjustments, the bar 12 may be accommodated to ware of different sizes.

A bar 12 of asbestos or other heat resisting material is secured to straps 13 which are pivotally mounted on the horizontal bar 10 to adapt the bar 12 to swinging movement, it normally assuming a lowered position as illustrated in Figure 3 of the drawings. The bar 12 functions to prevent tilting of the glassware 3 when it is subjected to movement by the pusher bar 7 and is hereinafter referred to as a stabilizing bar.

The transfer arm 7 is subjected to vertical movement both at the point of receiving the ware and when the ware is released on the lehr conveyor belt, such movement being diagrammatically illustrated in Figures 4 and 5 of the drawings. In Figure 4 the rectangle indicated by the arrows indicates that the transfer arm 7 is first subjected to a forward movement whereby the row of ware 3 is transferred from its receiving position shown in full lines in Figure 6 of the drawings to the dotted line position adjacent the lehr conveyor belt. When the transfer arm has reached its advanced forward position, it is subjected to vertical movement to clear the arm 7 with the glassware, such extreme vertical position being illustrated by the dotted line construction of the transfer mechanism in Figure 2 of the drawings. In its raised position, the transfer mechanism is returned along a horizontal path to its original ware receiving position when it is again lowered to the bottom position in which the arm 7 is illustrated in Figures 1 to 4 of the drawings, this cycle of movement being termed the ideal cycle or path of the transfer arm.

The mechanism for effecting such a cycle of movement of the transfer arm constitutes no part of the present invention, and is therefore not illustrated in the drawings. Provision is herein made for manipulating the stabilizing arm 12 to clear the ware in accordance with these movements of the transfer arm, and such manipulation is effected by means of the following mechanism:

A cam finger 14 is secured to the horizontal bar 10 to subject the bar to rotary movement about its axis and when bar 10 is subjected to such movement the stabilizing bar 12 is swung correspondingly. The cam 14 is adapted to strike a pin 15 mounted on a bracket 16 which is adjustably secured to the receiving platform 1 by means of a plurality of wing nuts 17. The bracket 16 is mounted so that pin 15 is in the path of the cam finger 14 when the transfer arm 7 is lowered. When the cam strikes the pin 15 the stabilizing bar is lifted away from the ware 3 and with the stabilizing bar in this open position, the pusher arm or transfer arm may be safely lowered behind a row of bottles without interference, and when the arm 7 is subjected to lateral movement, the cam finger 14 will clear the pin 15 and the stabilizing arm will drop to its lowered position limited by an adjustable stop screw 18 shown in Figures 1 to 3, to prevent tilting and upsetting of the ware as it is being transferred to the lehr conveyor 5.

There are conditions where the transfer mechanism is not subjected to horizontal and vertical movement in accordance with the ideal cycle diagrammatically illustrated in Figure 4, and under such conditions, different provisions must be made for lifting the stabilizing bar while the transfer arm is being raised or lowered out of and into engagement or alinement with the ware.

In Figure 5, for example, an irregular movement of the transfer arm 7 is diagrammatically shown by arrows to illustrate that the arm 7 is subjected to movement in a horizontal plane while being advanced to transfer the ware in the same manner as in Figure 4. At the end of such forward movement, the transfer arm 7 is not lifted vertically before the return movement, but is subjected to vertical movement simultaneously with the return movement whereby it is caused to travel through a path as shown by the inclined portion of the diagram. Similarly, as the transfer arm is lowered in alinement with the ware it is subjected to slight movement. Provision is made to manipulate the stabilizing arm to clear the ware when the transfer arm is subjected to such irregular movement, suitable mechanism being disclosed in Figures 7 to 10 of the drawings.

In the construction shown in Figure 7, the transfer arm 7 is of the pusher instead of the swinging type shown in Figure 6 and is subjected to straight line movement by means of a pusher ram 19. The stabilizing bar is manipulated by a cam finger 14 similar to the finger shown in Figures 1, 2 and 3 of the drawings. On account of the conveyor mechanism being at an inclination to the base of the transfer arm 7, the stabilizing bar 12 must be retained in its uppermost position for a sufficient period to permit the transfer arm 7 to bring into alinement all of the ware included in the row to be transferred before the stabilizing arm 12 is permitted to drop. To accomplish this, the cam finger 14 is adapted to engage a bar 20 instead of the pin 15, this bar being secured to the side of the receiving platform and being of sufficient length to maintain contact of the finger 14 during the travel of the transfer arm 7 from the time it engages the first bottle until the bottle on the other end of the row has been brought in aline- ment with the pusher arm at which time the finger 14 will have passed from the bar 20 and the stabilizing arm will be permitted to drop to its downward position to prevent tilting of the ware while it is being pushed forward onto the endless conveyor belt 5 of the annealing lehr 6.

Just before reaching the end of its advancing movement, the cam finger engages a stop pin 21 which is pivoted at 22 to a bracket 23 fastened to the side of the loading platform. This finger 21 is normally biased by a spring 24 to retain the position shown in Figure 9 of the drawings in which position it rests against an adjustable stop screw 25. The finger 21 is displaced by the cam 14 in the forward movement of the transfer mechanism and snapped back to its position against the stop 25 after the transfer mechanism has passed. Upon the return stroke or movement of the transfer arm, the cam 14 is engaged by the pin 21 and lifted thereby raising the stabilizing bar 12 as shown in Figure 9 to clear the top of the bottles and on the straight horizontal type of pusher the finger will subsequently engage the horizontal bar 20 to maintain the stabilizing bar in its raised position while the transfer arm is lowered behind the accumulated row of ware.

The path of movement of the transfer arm 7 is diagrammatically illustrated in Figure 10 of the drawings, and by means of the cam mechanism it is apparent that the stabilizing arm is manipulated to clear the ware both when it is lowered and when the transfer arm is first subjected to reverse movement.

In Figure 7, conveyor 2 may be considered as adjustable angularly with respect to the lehr. If bottles of small diameter are placed on the conveyor 2 with the same spacing (center to center) as shown, the conveyor 2 may be swung about the take-out position as a center, to make a greater angle with the front of the lehr. The lehr may be moved back to suit. The bottles will then be spaced more closely together on the transfer arm 7 and on the lehr conveyor 5, and there will be a larger number of bottles in a row.

It is evident from the foregoing description of this invention that a stabilizing arm of the character therein described prevents tilting or upsetting of glassware particularly high bottles of relatively small diameter to maintain them in vertical upright position while passing to and through the glass annealing lehr. It is also apparent that by means of the cam operating mechanism, the stabilizing arm may be utilized on both the swinging and the pusher type of transfer mechanism whether subjected to a so-called regular or ideal cycle of movement or an irregular cycle of movement without interferring with the rows of ware when the transfer arm is raised or lowered from its ware engaging position.

Although one embodiment of the invention has been herein illustrated and described, it will be obvious to those skilled in the art that various modifications may be made in details of construction without departing from the principles herein set forth.

I claim as my invention:

1. A ware transfer mechanism comprising a transfer arm adapted to engage a row of ware, and a stabilizing arm hinged to said transfer arm, means for raising and lowering said transfer arm, and means responsive to the raising and lowering movements of said transfer arm for swinging said stabilizing arm.

2. A transfer mechanism for glassware comprising a transfer arm adapted to engage rows of glassware, a stabilizing arm mounted on and adjustable with said transfer arm to accommodate ware of different sizes, said stabilizing arm being movable relative to said transfer arm, means for moving said stabilizing arm away from the ware when the transfer arm is moved to its ware engaging position, and means responsive to the movement of said transfer arm to cause said stabilizing arm to be moved into position to support the ware.

3. A transfer mechanism for transferring ware in rows from a receiving station to a lehr conveyor, comprising, a ware engaging transfer arm adapted to be raised and lowered, a stabilizing arm pivotally mounted to said transfer arm and adapted to assume a normally lowered position, a cam secured to displace said stabilizing arm, and means disposed in the path of the cam to actuate said stabilizing arm to prevent engagement thereof with the ware when the transfer arm is lowered to its ware engaging position.

4. In a ware transfer mechanism, a transfer arm adapted to engage a row of glassware, a stabilizing arm pivotally mounted to said transfer arm and adapted to be moved parallel with the ware, a cam for moving said stabilizing arm, and means disposed in the path of movement of the transfer arm whereby said cam is rendered operative to displace the stabilizing arm as the transfer arm engages the ware when the transfer arm is subjected to return movement and to cause said transfer arm to engage the ware during its subsequent transfer movement.

5. A transfer mechanism for transferring a row of bottles from a loading conveyor to a lehr conveyor when the loading conveyor is disposed at an inclination to the lehr conveyor, comprising, a transfer arm the ware engaging face of which is in transverse alinement with the longitudinal axis of the lehr conveyor belt, a stabilizing arm adapted to engage the ware to prevent tilting thereof when subjected to movement by the transfer arm, and means for holding said stabilizing arm, adjacent to the ware while the pusher arm is reassembling the ware in a row and subsequently moving said stabilizing arm into ware supporting position for the remaining period of movement of said transfer arm toward the lehr conveyor.

6. The combination of a lehr and a ware transfer mechanism, having a transfer station and a discharge station which comprises a swinging transfer arm adapted to engage a row of ware, and a stabilizing arm hinged to said transfer arm, means for raising and lowering said transfer arm, and means responsive to the raising and lowering movements of said transfer arm for swinging said stabilizing arm into ware engaging position at a transfer station and to disengage the ware at a discharge station.

7. A lehr loader including a pusher bar, means for raising and lowering the pusher bar and for moving it toward and from the lehr, a ware-steadying bar and means for moving the ware-steadying bar away from the pusher bar as the latter is lowered into operative position.

8. A lehr loader including a pusher bar, means for raising and lowering the pusher bar and for moving it toward and from the lehr, a ware-steadying bar pivotally associated with the pusher bar, a crank for swinging the ware-steadying bar about its pivot, and an abutment adapted to engage the crank as the pusher bar is lowered toward operative position.

9. A lehr loader including a pusher bar, means for reciprocating and for raising and lowering the pusher bar, a ware-steadying bar pivotally suspended adjacent the pusher bar, and a stop for limiting the movement of the ware-steadying bar toward the pusher bar.

10. A lehr loader including a pusher bar, means for reciprocating and for raising and lowering the pusher bar, a ware-steadying bar pivotally suspended adjacent the pusher bar, a stop for limiting the movement of the ware-steadying bar toward the pusher bar, and means for bodily swinging the ware-steadying bar away from the pusher bar.

GEORGE W. MEYER.